United States Patent [19]

Nalence

[11] Patent Number: 4,594,960

[45] Date of Patent: * Jun. 17, 1986

[54] LOW TIRE PRESSURE WARNING DEVICE WITH ATTACHED LID

[76] Inventor: Henry Nalence, P.O. Box 490, R.D. #1, Lambertville, N.J. 08530

[*] Notice: The portion of the term of this patent subsequent to Nov. 6, 2001 has been disclaimed.

[21] Appl. No.: 649,188

[22] Filed: Sep. 10, 1984

Related U.S. Application Data

[63] Continuation-in-part of Ser. No. 460,744, Jan. 24, 1983, Pat. No. 4,480,580.

[51] Int. Cl.$^4$ .............................................. B60C 23/04
[52] U.S. Cl. ................................. 116/34 R; 137/227; 152/427
[58] Field of Search ............ 116/34 R, 273; 137/227, 137/229; 124/60, 61; 152/427, 429

[56] References Cited

U.S. PATENT DOCUMENTS

| | | | |
|---|---|---|---|
| 1,129,450 | 2/1915 | Campbell | 137/227 |
| 3,251,336 | 5/1966 | O'Brien | 116/34 R |
| 4,337,718 | 6/1982 | Stewart et al. | 116/34 R |
| 4,480,580 | 11/1984 | Nalance | 116/34 R |

Primary Examiner—Charles Frankfort
Assistant Examiner—Thomas B. Will
Attorney, Agent, or Firm—Kenneth P. Glynn

[57] ABSTRACT

A low tire pressure warning device is described which comprises: (a) a housing having an elongated chamber therein which has a non-detachably mounted closure thereon, a first end of which is capable of communication with the interior of a tire and a second and opposite end thereof capable of communication with the exterior of said tire; (b) a spring-loaded piston mounted within said chamber, functionally connected so as to be axially movable within said chamber in response to changes in tire pressure, and so as to motivate a streamer upon movement of said piston in response to a predetermined tire pressure decrease; and, (c) a spring-mounted, colored warning streamer located within said second end of said chamber and capable of being mounted in a compacted fashion therein, said streamer being connectively related to said spring-loaded piston and capable of being spring motivated to stream out of said chamber, as a warning signal, in response to axial piston movement in response to a predetermined tire pressure decrease. In some embodiments a pressure responsive bladder is utilized in conjunction with the piston.

10 Claims, 7 Drawing Figures

LOW TIRE PRESSURE WARNING DEVICE WITH ATTACHED LID

RELATED APPLICATIONS

This application is a continuation-in-part of U.S. patent application Ser. No. 06/460,744, filed on Jan. 24, 1983 now U.S. Pat. No. 4,480,580 by Henry Nalence, entitled "Low Tire Pressure Warning Device".

BACKGROUND OF THE INVENTION

1. Field of the Invention

The present invention relates to a low tire pressure warning device having an arrangement which causes the release or "streaming" of a compacted, colored streamer in response to a decrease in tire pressure below a predetermined level. It is useful in the maintenance of vehicular tires, e.g. multi-axled truck trailers and tankers, to have early warning of a drop in tire pressure. This prevents unnecessary wear of tires and aids in safety of operation. Thus, the present invention is a convenient, relatively inexpensive and effective device to achieve early warning of tire pressure drop.

2. Prior Art Statement

U.S. Pat. No. 4,310,014 describes a pressure signaling system which involves the use of a spring-loaded set of indicators which rises to show a particular indicator when the tire pressure falls below a predetermined level. The indicators are color bands on a tubular portion which operates as an integral part of the valve stem.

U.S. Pat. No. 4,262,529 describes a pressure sensitive indicating device which includes a visual indication of a predetermined pressure threshold level. The device contains a bladder designed to expand upon exposure to increasing pressure levels. Distention of the bladder displaces an element which causes visible color portions to be displaced with different color portions to indicate pressure change.

U.S. Pat. No. 4,244,214 illustrates a three color band visual tire pressure indicator which operates on a spring-biased rod which is precalibrated to the desired normal pressure.

U.S. Pat. No. 4,066,033 combines the springbiased piston tire pressure indicator with a preset air actuated whistle which responds to a predetermined threshold tire pressure and activates an electronic device which signals the vehicle operator (note that this is the first device described which alerts a driver to tire pressure problems without the need for him to be very close to the problem tire).

U.S. Pat. No. 4,024,829 teaches an air leakage warning device which utilizes the spring-biased piston and the concept of a rupturable rubber sack which ruptures at a predetermined pressure to give an audible signal.

U.S. Pat. No. 3,990,467 illustrates a combined tire valve stem and pressure gauge which relies upon color bands to indicate whether tire pressure is above, at, or below the desired pressure.

U.S. Pat. No. 3,738,308 describes an alarm system which utilizes the spring-biased piston in conjunction with a signaling whistle detected by a sensing system on the vehicle which in turn generates a signal to the driver.

U.S. Pat. No. 3,230,968 relies upon pressure sensitive mechanisms with various color bands to indicate tire pressure.

Notwithstanding the foregoing prior art there is no teaching or suggestion involving the use of highly visible, colored streamers. The above prior art warning devices require either that the driver get out of his truck and walk all the way back and around the truck to check all tires or that complicated sound-responsive electronic signalling devices be incorporated into the devices for signalling the driver while still in the cab. Only the present invention enables a driver to look back from the front area of his truck and see the warning streamers when tire pressures are down. Only the present invention permits remote signalling without complicated and expensive electronic gadgetry. Only the present invention streamers alert passing cars to low tire pressure problems on trucks, and enable the drivers of the cars to give, e.g. a three beep, signal to the truck driver to warn him to inspect. Thus, only the present invention offers a low tire pressure warning system which combines the advantages of low cost, non-electronic, remote signalling and third party alert signalling. For these reasons, the present invention is neither taught nor rendered obvious by the prior art.

SUMMARY OF THE INVENTION

The low tire pressure warning device of the present invention, in general, includes a housing, a bladder and/or spring-loaded piston within the housing, and a spring-mounted, colored warning streamer. The housing has an elongated chamber with one end communicating with the interior of the tire and the other end with the exterior. In one embodiment, a spring loaded piston is balanced at a predetermined setting with one or more springs to move in response to changes in tire pressure. When pressure drops to a predetermined low level, piston actuates the release of the warning streamer. In another embodiment a bladder is mounted within the chamber of the housing to expand and contract in response to tire pressure increases and decreases. The bladder upon expansion and contraction axially moves the spring-loaded piston so as to spring motivate (i.e. pop out) the warning streamer. In a preferred embodiment, a closely fitted spring-loaded piston without the bladder responds directly to changes in tire pressure and releases pins which spring motivate the warning streamer.

DETAILED DESCRIPTION OF THE PRESENT INVENTION AND THE DRAWINGS

Figure 1:
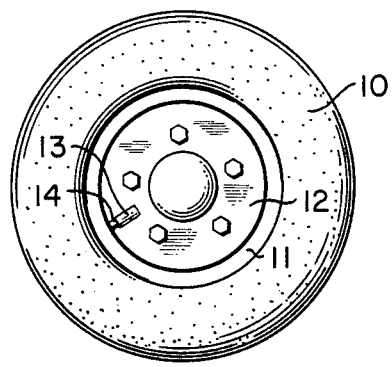
FIG. 1 is an elevational view of a typical motor vehicle pneumatic tire, incorporating a warning device of the present invention.

Referring now to the drawings, in FIG. 1, reference number 10 indicates a generally conventional form of pnuematic tire, mounted on rim 11 of wheel 12. The present invention warning device is shown as 13 and attached to valve stem 14.

Figure 2:
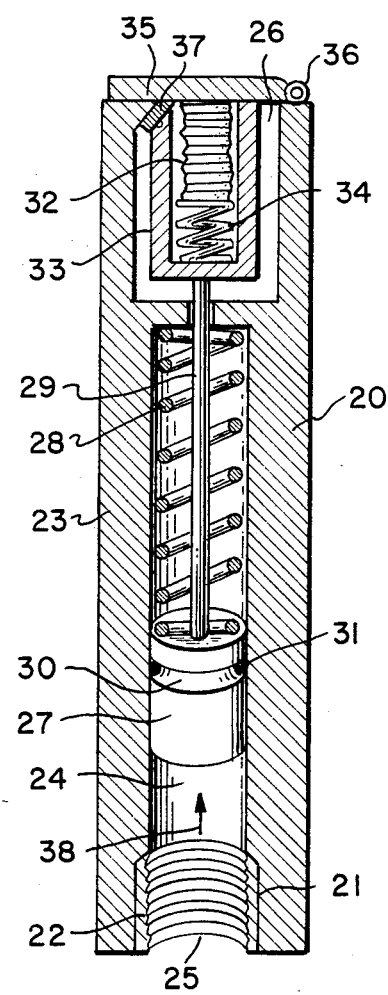
FIG. 2 is an enlarged cross-sectional view of one embodiment of the warning device of the present invention.

FIG. 2 shows a cross-sectional view of warning device 20 having screw threaded bushing 22, within counterbore 21 adapted for being screwed onto a conventional tire pressure valve stem. Housing 23 has an elongated chamber shown generally as 24 located therein; a first end 25 capable of communicating with the interior of a tire (in this case with bushing 22 and a tire pressure valve stem); and, a second end 26 opposite end 25 and capable of communication exterior of a tire.

Piston 27, which may be constructed of plastic or metal, is mounted within chamber 24 so as to be axially movable therein. The piston 27 is spring-loaded in a direction toward second end 25 via compression spring 28 surrounding piston rod 29. The piston 27 contains a peripheral groove 30 with a sliding seal 31 comprising an elastomeric O-ring. Piston 27 slidably moves axially within the chamber 24 and internal air pressure from the tire is maintained as a result of seal 31. Piston 27 and rod 29 are compressed toward the end 25 via spring 28 and toward the opposite end 26 via tire air pressure against the piston 27 and seal 31. Piston 27 and rod 29 are fitted within chamber 24 and rod 29 extends to opposite end 26. Rod 29 is connected to warning streamer 32 which is shown contained within holder 33 and is spring-loaded via spring 34. In this Figure, the warning streamer 32 is shown in its compacted state.

In this embodiment, lid 35 is connected via hinge 36 to the housing 23 and includes hinged latch 37. However, it should be recognized that a latch or door which may be opened in response to a charge is pressure could be used.

As shown in FIG. 2, tire air 38 (arrow) pushes on piston 27 such that lid latch 37 is fixed in the closed position and holds down lid 35. This, in turn maintains streamer 32 and spring 34 in their compacted state.

Figure 3:
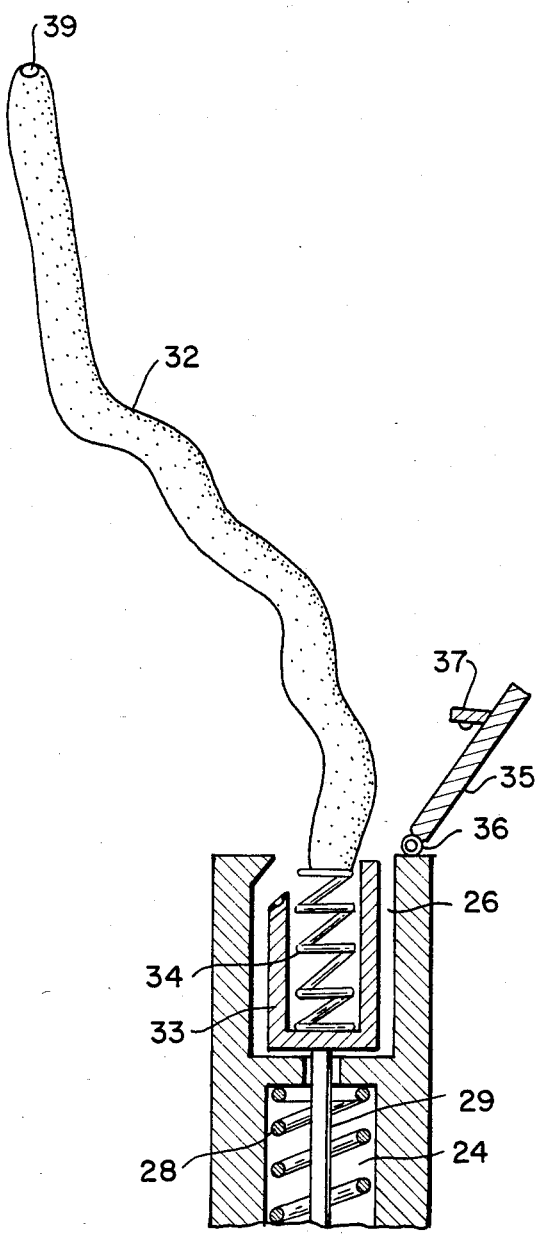
FIG. 3 is another cross-sectional view of the present invention warning device of FIG. 2, showing the warning streamer in the warning mode.

When tire pressure drops off, spring 28 pushes piston 27 downward toward end 25. As holder 33, which is connected to piston 27 and rod 29, moves downward in concert therewith, latch 37 is released and spring 34 forces lid 35 open and motivates warning streamer 32 to stream out, as shown in FIG. 3 (in which like elements are alike numbered). The streamer 32 is of adequate length to be visible by passers-by and by the driver from a distance of 25 to 50 ft. or so. Streamer 32 is colored so as to be highly visible and may even be made of "glow" or phosphorescent plastic.

In FIG. 3, optional weight (lead pinch ball) 39 is attached to enhance full streaming of streamer 32. Also, as mentioned, while non-detachable closure lid 35 and latch 37 are shown to hold the spring loaded streamer 32 in a compacted fashion, other mechanisms may be used which would be within the purview of the artisan. Spring-loaded, pressure activated "pops-ups" are as old as jack-in-the-box and alternative mechanisms need not be expounded upon.

Figure 4:
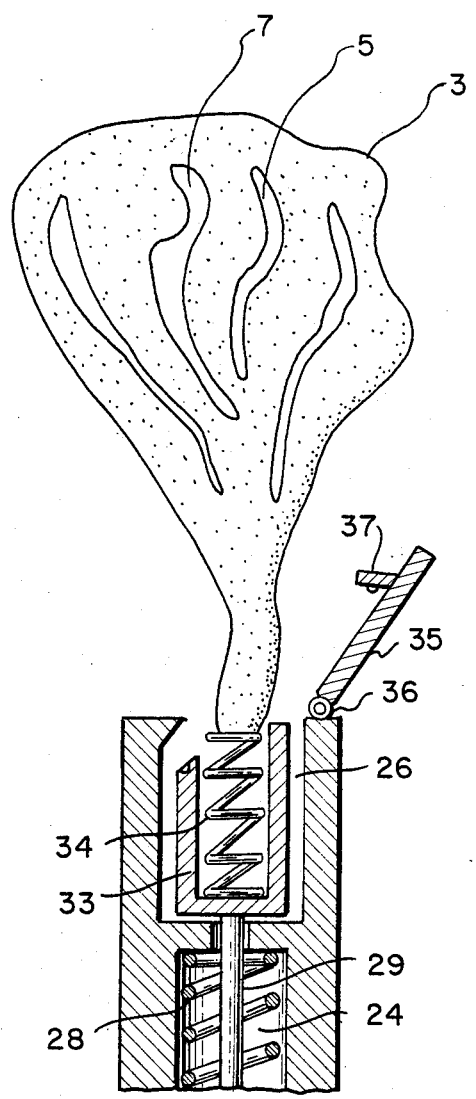
FIG. 4 illustrates a cross-sectional view of the FIG. 1 device but using an alternative warning streamer.

FIG. 4 shows the same device as in FIGS. 1, 2 and 3 and like parts are like numbered, except that alternative warning streamer 38 is employed. Warning streamer 3 is a parachute type warning mechanism which "balloons" out when released and contains air slits 5 and 7.

Figure 5:
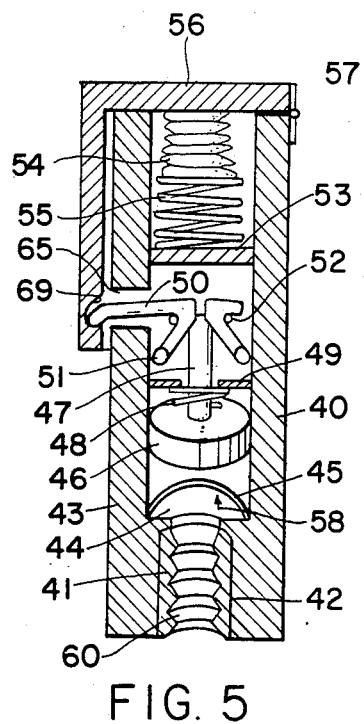
FIG. 5 is an enlarged cross-sectional view of another embodiment of the invention warning device which includes an expandable bladder.

FIG. 5 illustrates a cross-sectional view of another embodiment of the present invention. Shown is warning device 40 having screw threaded bushing 41 within counterbore 42 for attachment to a conventional tire pressure valve stem. Housing 43 includes bladder 45 (a diaphragm), piston 46, rod 47, compression spring 48, spring fixing bracket 49, lever 50, lever hinges 51, compression ring 52, base bracket 53, warning streamer 54 and spring 55. Also shown is permanently attached cover 56 connected by hinge 57. Tire air pressure 58 (arrow) pushes upward on bladder 45 which in turn pushes upward toward end 59 of chamber 44. Spring 48 pushes piston 46 downwardly toward opposite end 60 of chamber 44.

When a tire is fully inflated and warning device 40 is attached to the valve stem, the tire air pressure 58 (arrow) is great enough to maintain piston 46 in the position shown in FIG. 5, that is, with piston 46 and rod 47 compressed against levers 50 so that they extend through and beyond portal 65 of housing 43 so as to lock into place cover 56 wherein the lever 50 is inserted into groove 69. Likewise, locked-in non-detachable closure cover 56 maintains streams 54 and spring 55 within chamber 44 in a compacted fashion.

Figure 6:
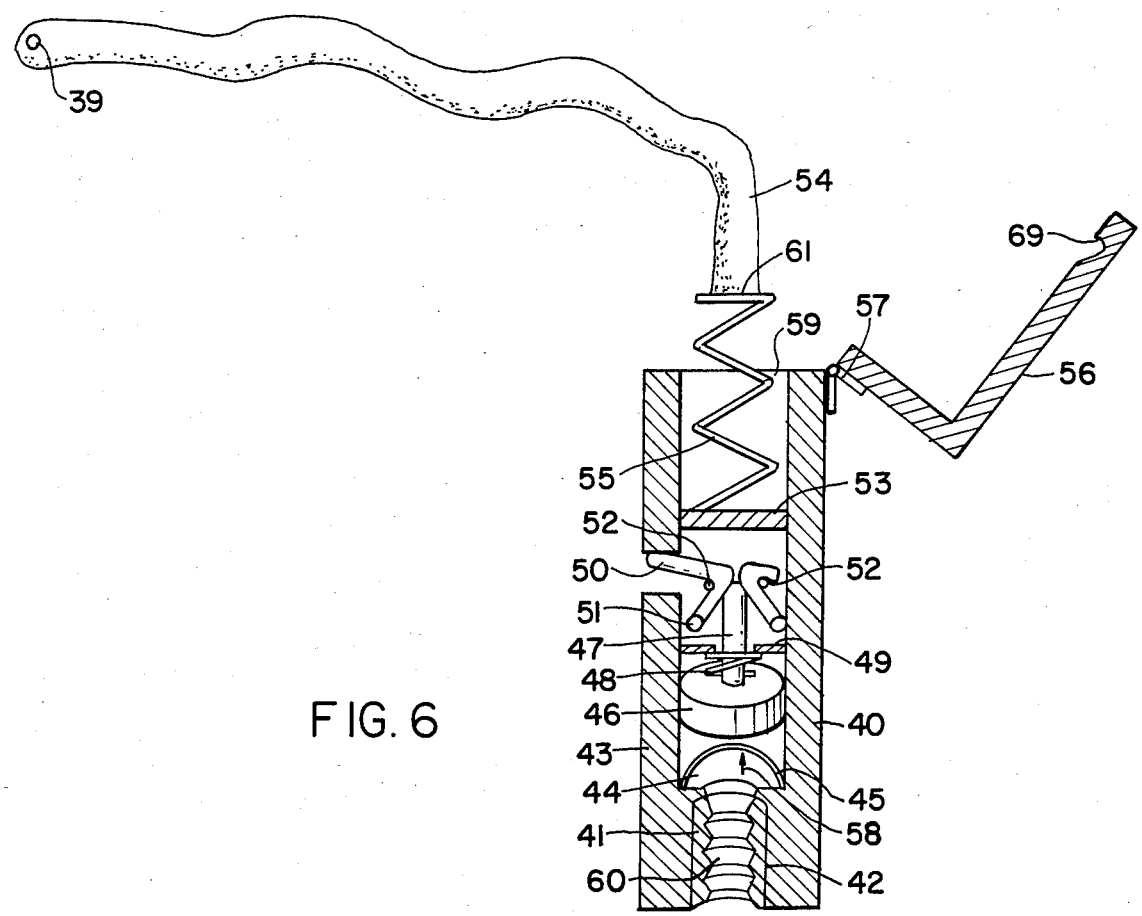
FIG. 6 is another cross-sectional view of the device of FIG. 5, showing the warning streamer in the warning mode; and, FIG. 7 shows the preferred embodiment device with an adjustment mechanism.

FIG. 6 illustrates the warning device of FIG. 5 when tire pressure drops below a predetermined level. Bladder 45 contracts in response to the pressure drop, piston 46 and rod 47 are pushed downward via the force of spring 48, and lever 50 is pulled inward as the end of rod 47 moves away and allows inwardly compressing spring 52 to pull the lever inward at portal 65. When this occurs, the force of spring 55 pops open cover 56 and motivates streamer 54 and weight 39 to stream out of the device as is shown.

Figure 7:
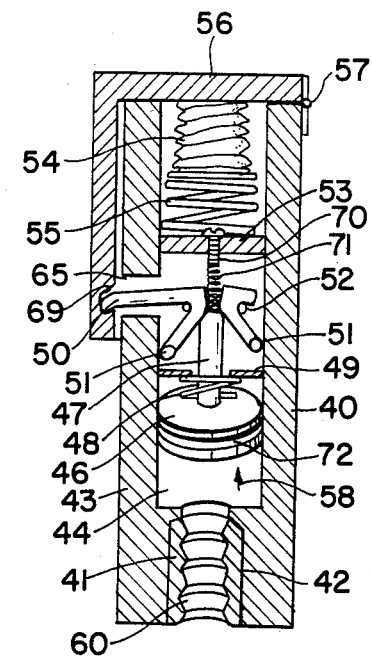

FIG. 7 shows a preferred embodiment device which includes an optional adjustment mechanism, in this case, adjustment screw 70 and adjustment spring 71. Screw 70 may be adjusted with a screwdriver when cover 56 is open and streamer 54 is out, exposing the top of screw 70 for adjustment. The downward force of spring 71 is adjusted against piston 47 to thereby adjust the pressure against bladder 45 which would be necessary to keep the device from being activated. While a screw and spring adjustment is shown here, alternative, known pressure-spring device adjustment mechanisms may be employed. Also, in this embodiment, no bladder is employed and seal 72 allows piston 46 to be directly responsive to pressure changes.

Other variations and substitutions should not be apparent to the artisan without exceeding the scope of the present invention. For example, a side air stem may be added to the device of the present invention such as that shown in FIG. 1 of the U.S. Pat. No. 4,066,033 issued on Jan. 3, 1978, and incorporated herein by reference. Likewise, a visible tire pressure indicator gauge now well known in the art, could be incorporated into the present invention. Thus, these and other changes to the foregoing examples would be within the contemplation of the present invention. The examples are presented for purposes of illustration only and the present invention should not be construed to be limited thereto.

What is claimed is:
1. A low tire pressure warning device, comprising:
  (a) a housing having an elongated chamber therein which has a closure thereon permanently attached during normal use, first end of which is connected to a tire valve so as to be capable of communication with the interior of a tire and a second and opposite end thereof capable of communication exterior of said tire;

(b) a spring-loaded piston mounted within said chamber, functionally connected so as to be axially movable within said chamber in response to changes in tire pressure, and so as to motivate a streamer upwardly and outwardly upon movement of said piston in response to a predetermined tire pressure decrease; and, (c) a spring-mounted, colored warning streamer loated within said second end of said chamber and capable of being mounted in a compacted fashion therein, said streamer being connectively related to said spring-loaded piston and capable of being spring motivated to stream out of said chamber, as a warning signal, in response to axial piston movement in response to a predetermined decrease in tire pressure.

2. The tire pressure warning device of claim 1, wherein said closure in said device further comprises a hinged cover permanently attached during normal use which closes over said second end of said chamber and over said streamer when mounted in a compacted fashion, said cap being affixed to said chamber so as to pop open said chamber simultaneously with said streamer being spring motivated to stream out of said chamber.

3. The tire pressure warning device of claim 2 wherein a weight is connected to the free end of said streamer.

4. The tire pressure warning device of claim 2 wherein said device further comprises a lever and pivot pin mechanism within said chamber which is connected to said piston and releasably connected to said cover so as to open said cover simultaneously with said streamer being spring motivated to stream out of said chamber.

5. The tire pressure device of claim 1, wherein said device further comprises a weighting component attached to the free end of said streamer which acts to enhance full streaming thereof upon spring motivation.

6. A low tire pressure warning device, comprising:
(a) housing having an elongated chamber therein which has a closure thereon permanently attached during normal use, a first end of which is connected to a tire valve so as to be capable of communication with the interior of a tire and a second and opposite end thereof capable of communication with the exterior of said tire.

(b) a bladder mounted within said chamber so as to expand and contract in response to pressure increases and decreases of said tire;

(c) a spring-loaded piston mounted within said chamber, functionally connected so as to be axially movable within said chamber in response to the expansion and contraction of said bladder and so as to motivate a streamer upwardly and outwardly upon contraction of said bladder in response to a predetermined tire pressure decrease; and, (d) a spring-mounted, colored warning streamer located within said second end of said chamber and capable of being mounted in a compacted fashion therein, said streamer being connectively related to said spring-loaded piston and capable of being spring motivated to stream out of said chamber, as a warning signal, in reponse to axial piston movement upon contraction of said bladder in response to a predetermined decrease in tire pressure.

7. The tire pressure warning device of claim 6, wherein said closure in said device further comprises a hinged cover permanently attached during normal use which closes over said second end of said chamber and over said streamer when mounted in a compacted fashion, said cap being affixed to said chamber so as to pop open said chamber simultaneously with said streamer being spring motivated to stream out of said chamber.

8. The tire pressure warning device of claim 7, wherein a weight is connected to the free end of said streamer.

9. The tire pressure warning device of claim 7, wherein said device further comprises a lever and pivot pin mechanism within said chamber which is connected to said piston and releasably connected to said cover so as to open said cover simultaneously with said streamer being spring motivated to stream out of said chamber.

10. The tire pressure device of claim 6, wherein said device further comprises a weighting component attached to the free end of said streamer which acts to enhance full streaming thereof upon spring motivation.

* * * * *